Aug. 13, 1935.  J. JUCKER  2,011,539
POULTRY HOUSE
Filed May 8, 1931  2 Sheets-Sheet 1
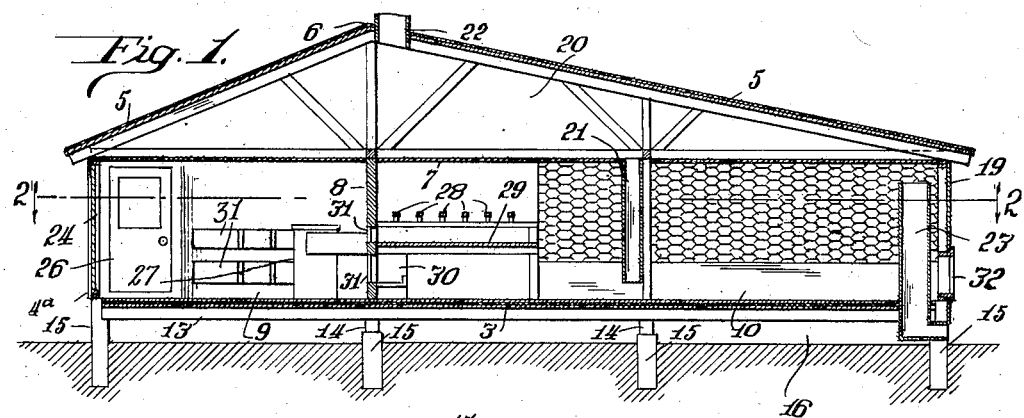
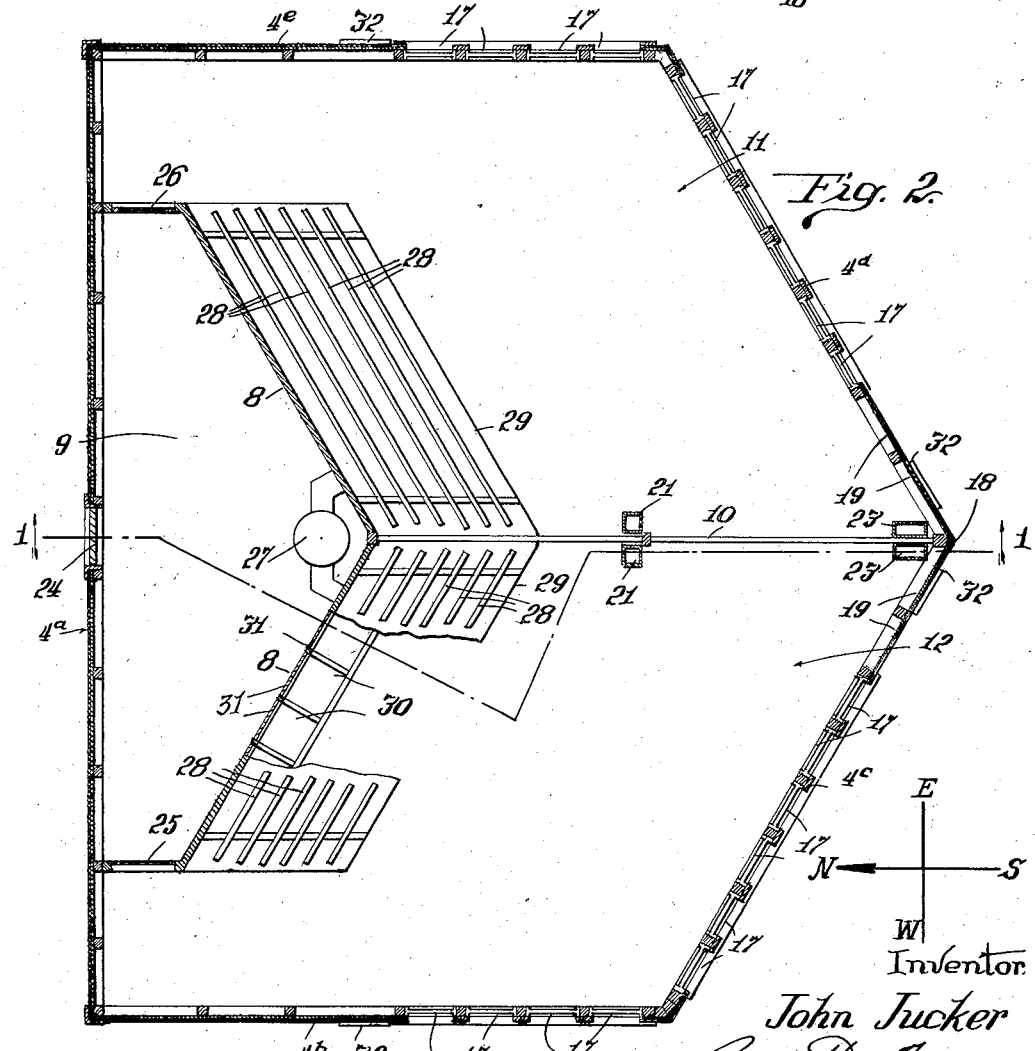
Inventor
John Jucker
By Barnett & Truman
Attorneys.

Aug. 13, 1935.     J. JUCKER     2,011,539
POULTRY HOUSE
Filed May 8, 1931     2 Sheets-Sheet 2
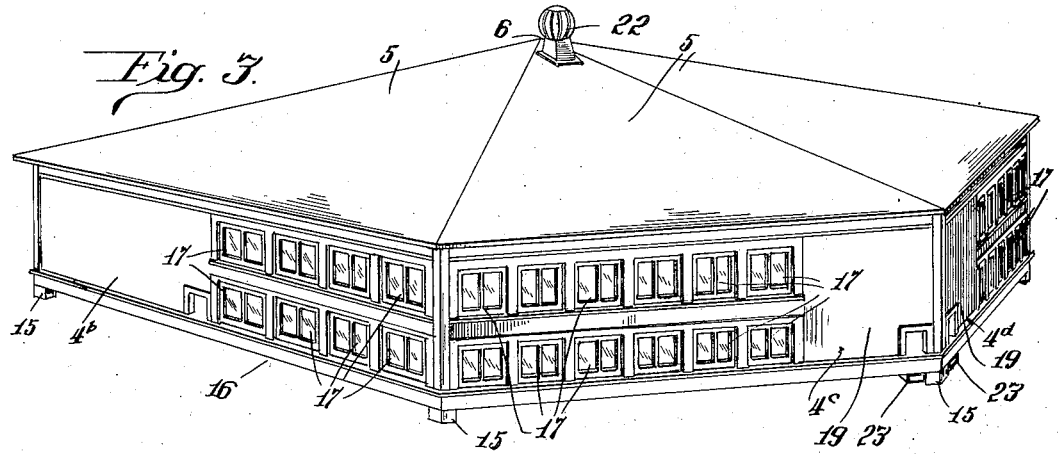
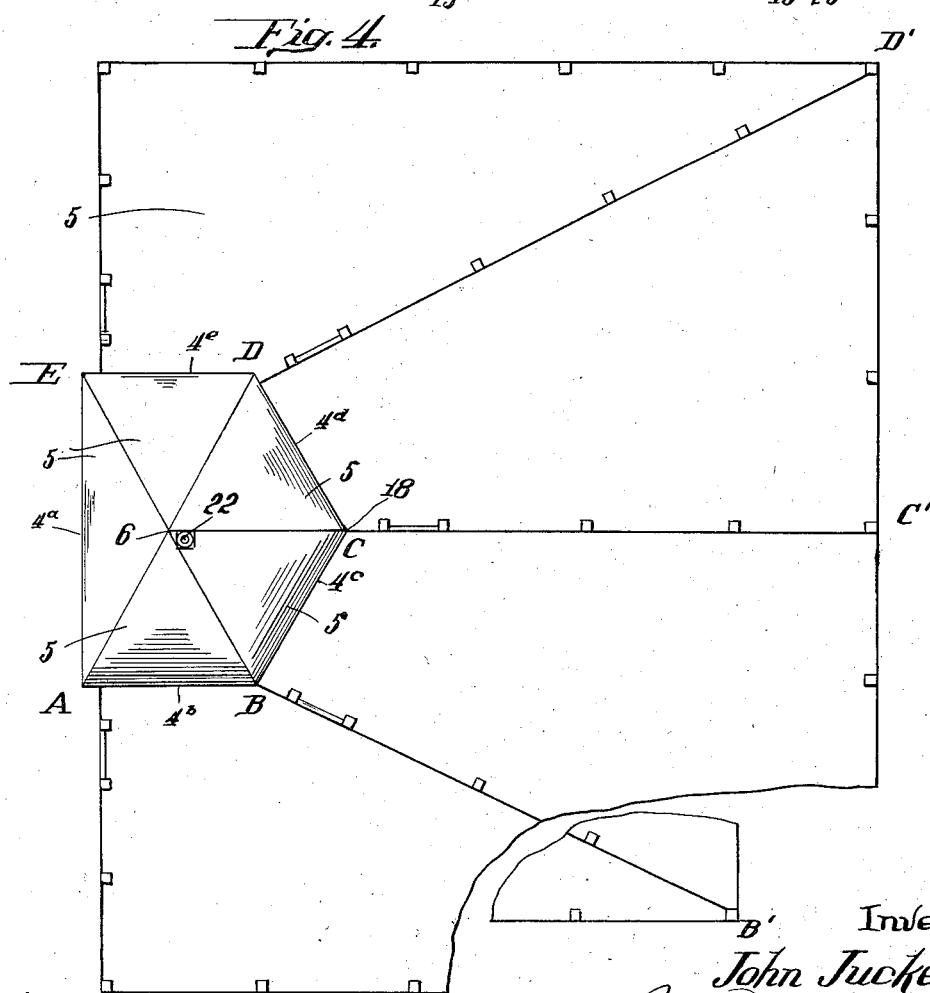
Inventor
John Jucker
By Barnett & Truman
Attorneys Patented Aug. 13, 1935

2,011,539

UNITED STATES PATENT OFFICE 2,011,539

POULTRY HOUSE

John Jucker, Chicago, Ill., assignor of one-half to Norman C. Mather, Chicago, Ill., Application May 8, 1931, Serial No. 535,846

5 Claims. (Cl. 119—21)

This invention relates to a poultry house of novel and compact construction.

One object of my invention is to provide a poultry house with greater floor area and housing capacity than existing types of poultry houses without increasing the exterior wall surface. This effects not only a saving in cost of construction but also economy of operation and convenience and general efficiency.

A further object is to provide an improved arrangement of windows which will permit the beneficial rays of the sun to enter the house to a greater degree and for a longer period each day than possible in existing types of poultry houses. This arrangement also provides protection against the intense heat of the mid-day sun.

A further object is to provide an improved arrangement of roosting rods and nests, which eliminates the possibility of dangerous drafts and injurious variations of temperature. This arrangement also includes means for readily cleaning the dropping-boards and nests without entering the roosting and laying room.

A further object is to provide a storeroom for feed and other materials which is adjacent to and communicates with the pens but which is also accessible from the outside of the house without entering the pens.

In the drawings:

Fig. 1 is a central vertical section through the improved poultry house taken substantially on the line 1—1 of Fig. 2.

Fig. 2 is a horizontal section taken substantially on the line 2—2 of Fig. 1, with a section broken away to show the arrangement of the nests.

Fig. 3 is a perspective view looking toward a side wall and one front wall.

Fig. 4 is a diagram showing the novel arrangement of yards and runways in conjunction with the house.

In the example here illustrated, this poultry house comprises a floor 3 in the shape of a pentagon, five vertical walls 4a, 4b, 4c, 4d, and 4e, a sloping roof 5, extending from the top of each wall to an apex 6, a flat ceiling 7, a partition 8, forming the storeroom 9, and a partition 10, dividing the main portion of the house into two compartments or poultry rooms, 11 and 12.

In its preferable embodiment the shape of the house in floor plan is a pentagon adapted from a true or equilateral hexagon by elimination of a triangular area; and the structure is supported by joists 13 which are raised above the ground level by beams 14, supported by the pilings 15. This provides an air space 16 between the floor and the ground for ventilation.

The front walls 4c and 4d and the forward portions of the side walls 4b and 4e are light-pervious. For example they may be provided with a plurality of windows 17. The partition wall 10 is preferably light-pervious, also, being either glazed or consisting of chicken wire. By orienting a building, so constructed, with the vertex 18 of the front wall structure 4c and 4d facing in a southerly direction (referring to the northern hemisphere), it is possible to obtain considerably longer periods of sunlight than when the front wall is flat. An abundance of sunlight is desirable for the health of the poultry.

To provide an area which is shaded from the mid-day sun during certain parts of the year, I prefer to leave a portion of the front walls adjacent to the vertex 19 unglazed.

Furthermore, a building of the shape described has considerably less exterior wall surface than a rectangular structure inclosing the same area. The preferred form of pentagonal structure shown requires about forty percent less exterior wall surface for inclosing the poultry rooms than a rectangular house of the same cross sectional area. This saving in wall surface effects an appreciable economy in cost of construction and in heating and also tends to centralize the entire system.

The above principle is adopted from the geometric law that a given exterior wall space will embrace the greatest area possible when arranged in the form of a circle. Consequently in a polygonal structure having a fixed amount of wall space, the area inclosed thereby will increase with the number of sides. Therefore, while I have chosen a pentagonal structure to best illustrate my poultry house, the invention is not restricted to a five sided structure. Should it be desirable to have a larger room or additional laying, brooding, or roosting rooms, the principle of construction of the present invention and the features thereof may easily be applied to a structure of hexagonal configuration or even to a polygonal structure having a greater number of sides.

The ceiling 7 is preferably insulated with suitable material. The flat construction of the ceiling obviates the currents of air developed in structures with sloping or irregular ceilings, thus eliminating dangerous drafts which are detrimental to the poultry and decrease egg production. It also provides an air space 20 between the roof and the ceiling which serves as further insulation against heat and cold.

The ventilating features of my house are best described with reference to Fig. 1. I have provided for the discharge of stale and foul air through hollow ducts 21 which extend through the ceiling 7 and into the house at a point near the floor. The air is carried upward through the ducts 21 and is discharged into the attic space 20 where by natural law it seeks high elevation and is released through the ventilator 22 which extends through the roof 5. It will be noted that by virtue of the pyramidal shape of the roof 5 the ascending currents of air will be directed through natural forces to the ventilator 22 which is positioned at the apex of the roof, thereby avoiding the possibility of trapped or stagnant air and obviating the use of more than one ventilator. Fresh air is introduced through ducts 23 extending from outside the structure through the floor and upward within the structure to a point near the ceiling.

The use of these ducts 21 and 23 insures indirect ventilation, free from all direct blasts of air from the outside and strong drafts. These ventilators of course can be made adjustable.

Referring to Fig. 2, 24 is a door leading from the outside to the storeroom 9 formed by the angular partition 8, 25 and 26 are doors leading from the storeroom 9 into the two laying and roosting rooms 11 and 12 formed by the partition 10. The partition 10 need not necessarily be solid and in the preferred form of my invention consists of hot-house sash or chicken wire. By the use of such material both rooms have the benefit of the sunlight from sunrise to sunset. I prefer this division of the house into two main rooms for the segregation of different types or breeds of poultry, and to facilitate feeding and watering, although the partition 10 is not indispensable and may be removed to form one large room.

The storeroom 9 is used for storing feed, nest materials and other supplies and implements. In heating the house a suitable stove 27 may be located in the forward central portion of this storeroom equipped with suitable pipes leading into the laying and roosting rooms 11 and 12. By thus centrally locating the heating element it is possible to heat the house without the necessity of installing an extensive piping system.

The roosts 28 and the dropping-boards 29 are located in the roosting rooms 11 and 12 adjacent to the angular partition 8. As will be seen the roosts when so located are a considerable distance from any exterior wall, thus reducing the possibility of being affected by variations in outside temperature. Also there is less chance of loss of heat radiated from the poultry through the walls. The angular shape of the back wall of the roosts, partition 8 also tends to dissipate any currents of air, thereby further minimizing the danger of drafts through spaces occupied by the poultry.

The nests 30 are located beneath the dropping-boards 29 and are not only protected from downward drafts by the dropping-boards but are also insulated from exterior walls and protected by the angular shape of the back wall 8.

The nests 30 and the dropping-boards 29 are accessible from the storeroom 9 by means of the hinged doors or sliding panels 31. Through this expedient the nests and dropping-boards may be cleaned or the eggs collected directly from the storeroom 9 without the necessity of the attendant walking around into the laying and roosting rooms. This is not only a saving of steps and time for the attendant but, as is well known by poultrymen, hens will lay with a greater uniformity if undisturbed.

The novel yard arrangement in connection with this type of house is illustrated in Fig. 4. The desirability of alternate runways or yards is common knowledge. When poultry run in a given area it quickly becomes devoid of all vegetation and pitted with scratch-holes. These scratch holes fill with water when it rains and soon develop into mud holes filled with stagnant and polluted water. The yard also may become infected with germs and parasites. To eliminate this undesirable situation poultrymen have, when possible, provided alternate yards or runs. Thus while one yard is being used by the poultry the other may be plowed up, leveled off, treated with disinfectant and even seeded to furnish tender sprouts and greens for the poultry. The customary procedure, if space is available, has been to provide a supplemental yard of the usual rectangular construction, located either on the other side of the house or elsewhere. The novel shape of my house readily adapts itself to an arrangement of alternate yards of approximately equal areas with the use of a comparatively small amount of fencing material, each of which yards is readily accessible from the house.

This arrangement is effected by extending fence wire partitions B—B', C—C' and D—D' as indicated (Fig. 4) from the corner of the house D to the corner D' of the main fence; from corner C of the house to point C' of the fence; and from corner B of the house to corner B' of the fence. Each side of the house (except side 4a) is equipped with an exit 32, Figs. 2 and 3, provided with a door of known construction which can be opened or closed.

Although I refer to my invention as a poultry house and have confined my description in most instances to poultry I claim many of the features of the shape and general arrangement of my disclosure as adaptable for other allied uses such as for the raising of rabbits, guinea pigs, and other animals.

Furthermore I do not wish to restrict the invention to structures of five sides or more, inasmuch as several of the features of the invention may be used in a rectangular structure for example.

Realizing the possibility of these and other changes obvious to those skilled in the art, I desire to be understood as intending to cover by patent all modifications of the disclosed structures within the scope of the appended claims.

I claim:

1. A poultry house having a light pervious front wall comprising two wall sections at an angle to each other, an angular partition substantially parallel with the front wall providing a storeroom in the rear part of the structure, chicken nests arranged along the central portion of the angular partition facing the front wall, and a door between the storeroom and the rest of the structure, said door being positioned in one end of said angular partition substantially adjacent the rear wall of the structure.

2. A poultry house having a rear wall, a light pervious front wall comprising two wall sections at an angle to each other, light pervious side walls, an angular partition providing a storeroom in the rear part of the structure, the front and side portions of said angular partition being substantially parallel to the front and side walls, respectively, of the poultry house, a door providing an entrance to said storeroom directly from outside of the poultry house and a door between the storeroom and the rest of the poultry house, said latter door being positioned substantially adjacent a rear corner of the poultry house.

3. A poultry house having a rear wall, a light pervious front wall comprising two wall sections at angles to each other, light pervious side walls, an angular partition substantially parallel with the front wall providing a storeroom in the rear part of the structure, a light pervious partition between the vertices in the front wall and the angular partition providing poultry rooms, and a door between said storeroom and each of said poultry rooms, each of said doors facing a side wall of the structure.

4. A poultry house having a light pervious front wall which projects substantially further forward at its central portion than at its ends, an inner partition connecting at its ends to the rear wall of the house and projecting intermediately toward the front wall to form a poultry room in the front of the house and a storeroom in the rear of the house, roosts and nests in said poultry room adjacent said inner partition, means giving access to the nests from the storeroom, a door between the storeroom and the outside of the poultry house and a door between the storeroom and the poultry room.

5. A poultry house with a partition extending inwardly from the rear wall thereof to form a poultry room and a storeroom, one wall of the storeroom and the front and side walls of the poultry room each being in common with another wall of the poultry house, roosts and dropping boards positioned in said poultry room adjacent the partition and remote from the outside walls of the structure, said partition having openings adjacent said roosts and dropping boards to provide access thereto from said storeroom, closures for said openings and a door in said partition to permit passage from the storeroom to the poultry room.

JOHN JUCKER.